(12) United States Patent
Hendriks et al.

(10) Patent No.: US 11,119,305 B2
(45) Date of Patent: Sep. 14, 2021

(54) LENS SYSTEM

(71) Applicant: KONINKLIJKE PHILIPS N.V., Eindhoven (NL)

(72) Inventors: Bernardus Hendrikus Wilhelmus Hendriks, Eindhoven (NL); Jeff Shimizu, Cortlandt Manor, NY (US); Stein Kuiper, Neerijnen (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 493 days.

(21) Appl. No.: 15/876,709

(22) Filed: Jan. 22, 2018

(65) Prior Publication Data

US 2018/0143422 A1    May 24, 2018

Related U.S. Application Data

(62) Division of application No. 12/666,545, filed as application No. PCT/IB2008/052532 on Jun. 25, 2008, now abandoned.

(60) Provisional application No. 60/946,766, filed on Jun. 28, 2007.

(51) Int. Cl.
G02B 23/24 (2006.01)
G02B 26/10 (2006.01)

(52) U.S. Cl.
CPC ......... *G02B 23/243* (2013.01); *G02B 26/103* (2013.01)

(58) Field of Classification Search
CPC .. G02B 21/025; G02B 23/243; G02B 26/103; G02B 3/0081; G02B 13/12; G02B 15/00; G02B 15/142

USPC ................ 359/421–422, 432, 676
See application file for complete search history.

(56) References Cited

U.S. PATENT DOCUMENTS

| | | | |
|---|---|---|---|
| 3,608,998 A | 9/1971 | Rinker | |
| 4,312,572 A | 1/1982 | Yamashita | |
| 4,488,039 A | 12/1984 | Sato | |
| 4,664,486 A * | 5/1987 | Landre | G02B 23/2469 359/380 |
| 4,666,262 A | 5/1987 | Zobel | |
| 4,704,007 A | 11/1987 | Landre | |
| 5,214,538 A | 5/1993 | Lobb | |

(Continued)

FOREIGN PATENT DOCUMENTS

| | | |
|---|---|---|
| EP | 1543370 B1 | 2/2011 |
| JP | 2006242976 A | 9/2006 |

(Continued)

OTHER PUBLICATIONS

Wikipedia page "Zoom lens" (Year: 2006).*

*Primary Examiner* — George G King

(57) ABSTRACT

A lens system comprises a first lens group and a second lens group, and is configured to form an image at a first magnification and at a second magnification. The lens system has a common optical axis in both magnifications. The lens system is further configured to form an intermediate image between the first lens group and the second lens group at the first magnification. The intermediate image formed in the first magnification is further imaged onto an optical detector. In the first magnification, the second lens group acts as a relay lens imaging the intermediate image onto the optical detector. In the second magnification, the first and second lens groups together form an image on the optical detector without forming an intermediate image.

17 Claims, 7 Drawing Sheets

(56) References Cited

U.S. PATENT DOCUMENTS

| | | | |
|---|---|---|---|
| 5,836,869 A | | 11/1998 | Kudo |
| 6,166,784 A | * | 12/2000 | Murata ................ G02B 23/243 349/1 |
| 6,369,954 B1 | | 4/2002 | Berge |
| 6,400,514 B2 | | 6/2002 | Minami |
| 6,450,949 B1 | | 9/2002 | Farkas |
| 6,530,882 B1 | | 3/2003 | Farkas |
| 6,934,090 B2 | | 8/2005 | Nagaoka |
| 7,126,903 B2 | | 10/2006 | Feenstra |
| 2004/0158129 A1 | | 8/2004 | Okada |
| 2005/0052753 A1 | | 3/2005 | Kanai |
| 2007/0133103 A1 | | 6/2007 | Stempel |
| 2007/0139751 A1 | | 6/2007 | Kuiper |

FOREIGN PATENT DOCUMENTS

| | | |
|---|---|---|
| WO | 2006037772 A1 | 4/2006 |
| WO | 2006056014 A1 | 6/2006 |

* cited by examiner

LENS SYSTEM

CROSS-REFERENCE TO RELATED APPLICATIONS

The present application is a divisional patent application under 37 C.F.R. § 1.53(b) of co-pending U.S. patent application Ser. No. 12/666,545, filed on Dec. 23, 2009, which is the U.S. National Phase application under 35 U.S.C. § 371 of International Application Serial No. PCT/IB2009/052532, filed on Jun. 25, 2008, which claims the benefit of U.S. Provisional Application No. 60/946,766, filed Jun. 28, 2007. These applications are hereby incorporated by reference herein.

FIELD OF THE INVENTION

This invention relates to a lens system, more in particular to the lens system included in an optical biopsy device.

BACKGROUND TO THE INVENTION

A biopsy is carried out during a minimal-invasive surgery to determine the status of a suspicious lesion. Since suspicious lesions must be visible for a surgeon, these biopsies are taken generally in a later stage of a disease. The biopsies are then sent to a pathologist to examine target tissue sections. The outcome thus depends on the local tissue samples that may or may not represent the actual disease stage in the tissue. Optical biopsy is an alternative method, where in-vivo optical technology is used to determine whether the disease has affected the tissue. This method also enables the diagnosis of the disease in an early stage. Light can interact with tissue in a number of ways, including elastic and inelastic (multiple or single) scattering, reflection at boundary layers and absorption, and can for instance lead to fluorescence and Raman scattering. All of these can be utilized to measure any abnormal change in tissue. This is beneficial to a patient, because no tissue is removed and an analysis can be performed in real time on the spot at all necessary locations. Furthermore, automatic diagnosis would save time for the patient as well as for the surgeon who can diagnose and treat the person instead of waiting for pathology results.

An optical biopsy device must fulfill two requirements to be useful. Firstly, it must be able to scan a significant area within a limited time. Secondly, it must have a high sensitivity and specificity. Currently, various optical methods have been proposed for cancer detection. The available methods capable of screening larger areas (in general non-point-like methods) have a high sensitivity but a rather low specificity. Hence, these methods produce a lot of false positives. Methods that have a much higher specificity are, in general, point-like measuring methods. These methods can give a good diagnosis but are not suited to scan significant areas in a short period of time. To fulfill both of the above-mentioned requirements, two different optical devices are required. One based on "camera" like imaging and capable of viewing larger areas, and another one based on "microscope" like imaging and capable of viewing tissue on a cellular level. It is apparent that biopsy procedures would be more efficient and effective if a single optical biopsy device can switch between two different views of a target site without the device having to be removed from the patient.

Although combining camera and microscope functions in one device has been described in U.S. Patent Application Publication No. US-A1-20040158129, the two optical modalities are still separate entities placed alongside each other. This results in rather bulky devices. Since for minimal invasive procedures the width of the device is of utmost importance, such solutions as described in US-A1-20040158129 may not be preferable.

It would therefore be advantageous to have an optical biopsy device which does not have the disadvantage described above and, more in particular, to have a compact optical biopsy device that enables camera-like (macroscopic) and microscope-like imaging.

Particular and preferred aspects of the invention are set out in the accompanying independent and dependent claims. Features of the dependent claims may be combined with features of the independent claims and with features of other dependent claims, as appropriate and not merely as explicitly set out in the claims.

SUMMARY OF THE INVENTION

According to a first aspect of the invention, a lens system has a first lens group and a second lens group and is configured to form an image at a first magnification and at a second magnification, wherein the lens has a common optical axis in both magnifications. The lens system is further configured to form an intermediate image between the first lens group and the second lens group at the first magnification. The intermediate image formed in the first magnification is further imaged onto an optical detector. The first magnification allows viewing a significant area of a target being imaged whereas the second magnification allows viewing the target with a high sensitivity and specificity. In the first magnification, the second lens group acts as a relay lens imaging the intermediated image onto the optical detector. In the second magnification, the first and second lens groups together form an image on the optical detector without forming an intermediate image between the first and the second lens groups.

According to a first aspect of the invention, a lens system for an optical biopsy device has a first lens group and a second lens group configured to form an image at a first magnification and at a second magnification, wherein the lens system has a common optical axis in both magnifications. The lens system is further configured to form an intermediate image between the first lens group and the second lens group at the first magnification. The intermediate image formed in the first magnification is further imaged onto an optical detector. The first magnification allows viewing a significant area of a target being imaged whereas the second magnification allows viewing the target with a high sensitivity and specificity. For minimal invasive procedures, it is critical to have a compact optical biopsy device. If viewing at two different magnifications is combined in a single objective lens system, a significant reduction in the width of the biopsy device is achieved and also larger areas can be viewed with a higher specificity. In the first magnification, the second lens group acts as a relay lens imaging the intermediated image onto the optical detector. In the second magnification, the first and second lens groups together form an image on the optical detector without forming an intermediate image between the first and the second lens groups.

According to a preferred embodiment of the invention, the first magnification is associated with a macroscopic view and the second magnification is associated with a microscopic view. A macroscopic view enables viewing a significant area of a target whereas a microscopic view enables viewing the target on a cellular level with high specificity and sensitivity. For an optical biopsy device to be practically useful, a combination of a macroscopic view capable of viewing a larger area of the target and a microscopic view capable of viewing the target on a cellular level is important.

According to another embodiment of the invention, the absolute value of the first magnification is at least 100 times smaller than the absolute value of the second magnification. The higher magnification allows viewing the target on a cellular level with high specificity and sensitivity while the lower magnification allows viewing a significant area of the target. Having two different magnifications in a single unit yields a compact optical biopsy device that enables camera-like (macroscopic) and microscope-like imaging.

According to a further embodiment of the invention, the first lens group has a focal length $F_1$ and the second lens group has a focal length $F_2$ and the first lens group and the second lens group are at a distance of $D_{12}$. The focal length $F_1$ of the first lens group is preferably smaller than the distance $D_{12}$ This constraint ensures that the intermediate image is formed at the first magnification.

According to a still further embodiment of the invention, the focal length $F_1$ of the first lens group and the focal length $F_2$ of the second lens group comply with $|F_2/F_1|>1$. The focal length of the second lens group is larger than that of the first lens group in order to be able to image the intermediate image onto the detector in the first magnification, while allowing imaging of the object onto the detector without intermediate image in the second magnification.

According to a second aspect of the invention, an optical biopsy device comprises an inserting tube to be inserted into a body; and a lens system secured in a tip end of the inserting tube having a first lens group and a second lens group configured to form an image at a first magnification and at a second magnification. The lens system has a common optical axis in both magnifications. The lens system is further configured to form an intermediate image between the first lens group and the second lens group at the first magnification. With this kind of optical biopsy device, the examining physician could scan a larger area of the target (macroscopic view) and, upon noticing a suspicious region, directly view in situ the single cells (microscopic view) to make a pathological determination during the course of a single optical biopsy procedure.

According to an embodiment of the invention, the optical biopsy device further comprises a switchable lens system configured for switching between the first magnification and the second magnification. The switchable lens allows more design freedom for the optical biopsy device.

According to another embodiment of the invention, the switchable lens system is configured to work according to the electro-wetting principle. Such lenses do not have moveable parts, thus making a compact and robust lens system design possible.

According to another embodiment of the invention, the switchable lens system is configured to work by displacing a lens.

According to a still further embodiment of the invention, the second lens group consists of at least one fixed lens and one switchable lens. This combination improves aberration control in the lens system that can be used to increase the performance of the first lens group.

According to a further embodiment of the invention, the optical biopsy device further comprises an image sensor. The image formed by the lens is imaged on to the image sensor.

According to a still further embodiment of the invention, the optical biopsy device further comprises a fiber bundle configured for relaying an image formed and a console optically coupled to the fiber bundle. The console is configured for reading out the image formed. The image sensor is generally integrated into an optical head. To make the design of the optical head simpler, the image can be relayed using the fiber bundle. Instead of being imaged onto the image sensor, the target is imaged on one end of a fiber bundle. This fiber bundle consists of many tiny fibers. The image is relayed by this fiber bundle to the other end of the fiber bundle. The other end of the fiber bundle is probed by the beam of a console of the optical biopsy device.

According to another embodiment of the invention, the optical biopsy device further comprises a single scanning fiber configured for reading out an image formed and a console optically coupled to the single scanning fiber. The console is configured for reconstructing the image formed.

BRIEF DESCRIPTION OF THE FIGURES

These and other characteristics, features and advantages of the present invention will become apparent from the following detailed description, taken in conjunction with the accompanying drawings, which illustrate, by way of example, the principles of the invention. This description is given for the sake of example only, without limiting the scope of the invention. The reference figures quoted below refer to the attached drawings.

DETAILED DESCRIPTION OF THE INVENTION

Figure 1A:
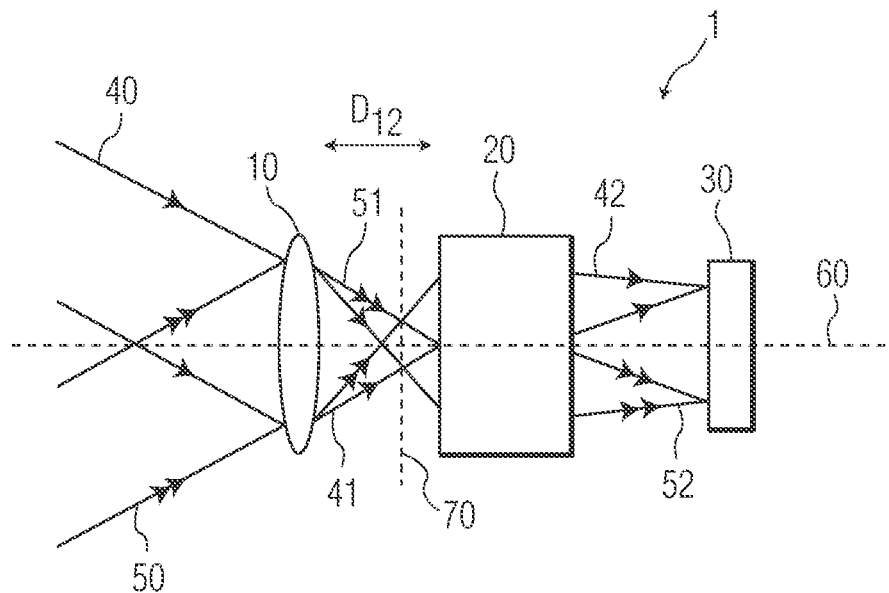
FIGS. 1a and 1b show an optical biopsy device according to an embodiment of the invention.

Particular and preferred aspects of the invention are set out in the accompanying independent and dependent claims. Features of the dependent claims may be combined with features of the independent claims and with features of other dependent claims, as appropriate and not merely as explicitly set out in the claims.

The present invention will be described with respect to particular embodiments and with reference to certain drawings, but the invention is not limited thereto but only by the claims. Any reference signs in the claims shall not be construed as limiting the scope. The drawings described are only schematic and are non-limiting. In the drawings, the size of some of the elements may be exaggerated and not drawn to scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

In the context of the invention, target can be any interior region including lung, bladder, abdominal cavity, knee joint and the like. The examining physician can examine the interior region and upon noticing a suspicious region i.e. a lesion, he can view in situ the single cells of the lesion. Target can also be any surface to be inspected for its defects. In the same context, macroscopic viewing refers to viewing a larger area of the target and microscopic viewing refers to viewing the target on a cellular level with high sensitivity. In the context of the invention, first lens group refers to lens elements between a target and an intermediate image and second lens group refers to lens elements between the intermediate image and an image sensor.

Figure 1B:
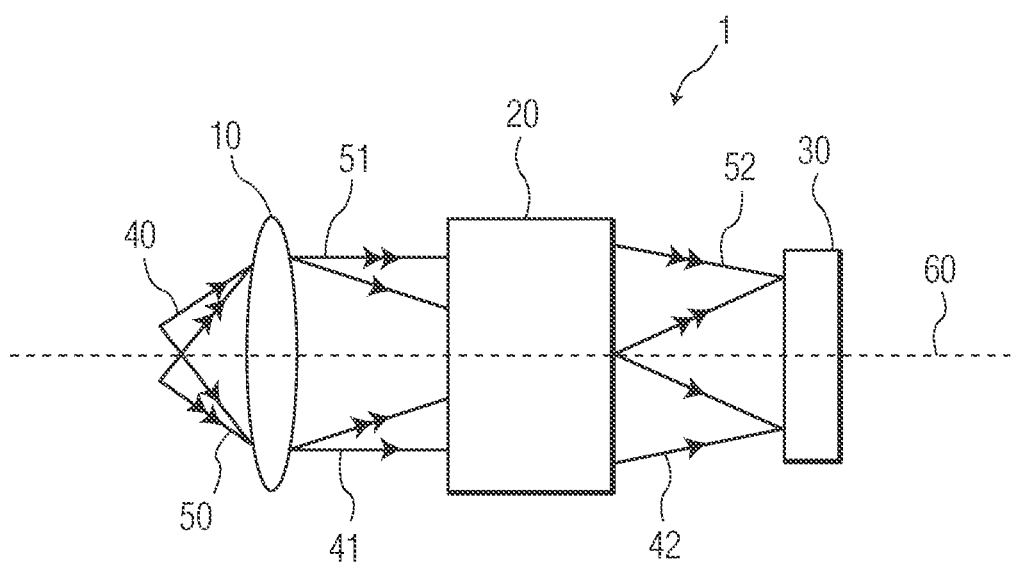
Figure 1C:
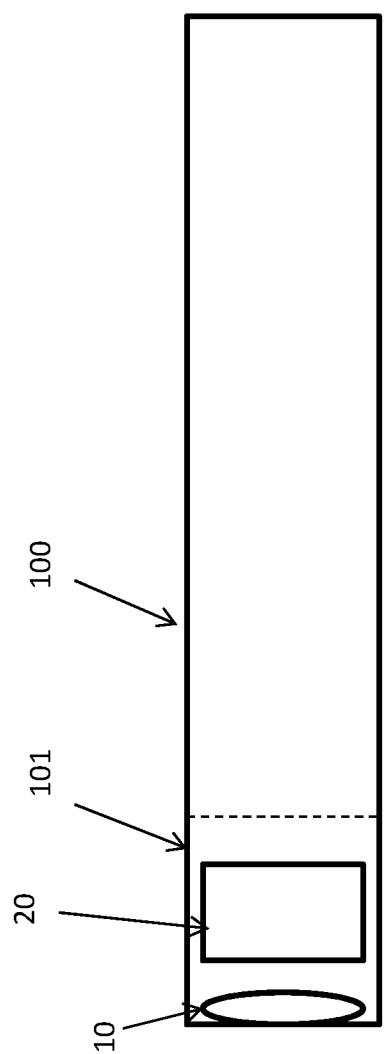
FIG. 1c shows an inserting tube having a lens system in a tip end according to an embodiment of the invention.

A lens system of an optical biopsy device 1 as shown in FIG. 1a consists of a first lens group 10 and a second lens group 20 having an optical axis 60. The lens system, at a first magnification, transforms a beam 40, 50 emerging from a distant target (shown as 8 in FIG. 2a) into a beam 41, 51 and forms an intermediate image at plane 70. The beam 41, 51 is further transformed into a beam 42, 52 by the second lens group 20. The intermediate image is further imaged onto an image sensor 30 by the second lens group 20. At the second magnification, as shown in FIG. 1b, the lens system images a target from close proximity, without forming any intermediate image between the first lens group 10 and the second lens group 20. The second lens group 20 images the beam onto the image sensor 30. FIG. 1c shows an inserting tube 100 configured to be inserted into a body (not shown). The inserting tube 100 has the lens system disposed in a tip end 101. The lens system comprises the first lens group 10 and the second lens group 20.

Figure 2A:
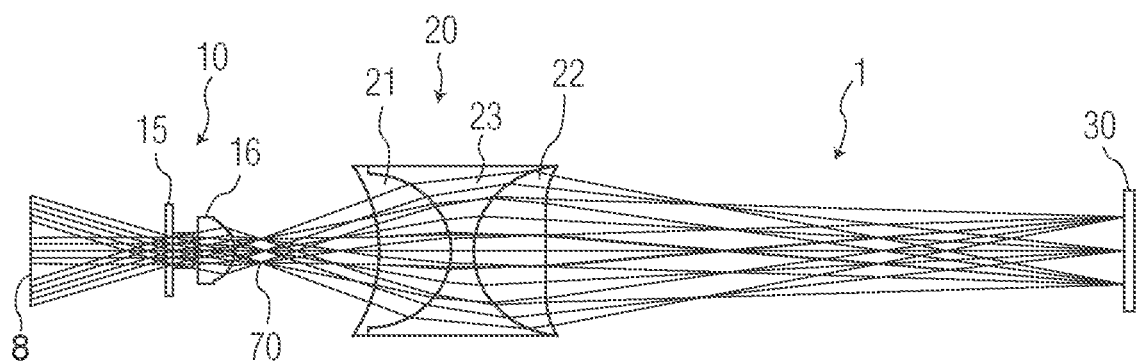
FIGS. 2a and 2b show an optical biopsy device according to an embodiment of the invention.
Figure 2B:
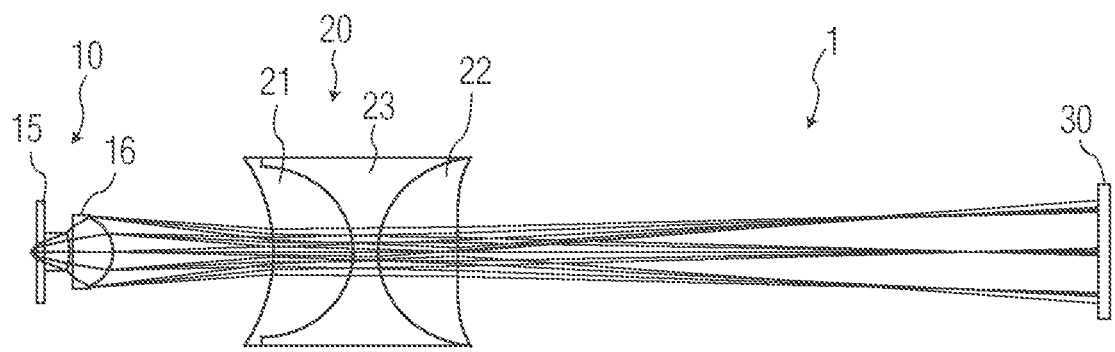

The second lens group 20 consists of a switchable lens configured for switching viewing between the first magnification and the second magnification of the optical biopsy device 1, as shown in FIGS. 2a and 2b. The second lens group 20 includes two lenses 21 and 22 arranged in such a way that they form a cavity 23 between them. The image is formed on an image sensor 30. A protective glass plate 15 is placed before a lens 16 and they together form the first lens group 10.

Figure 3A:
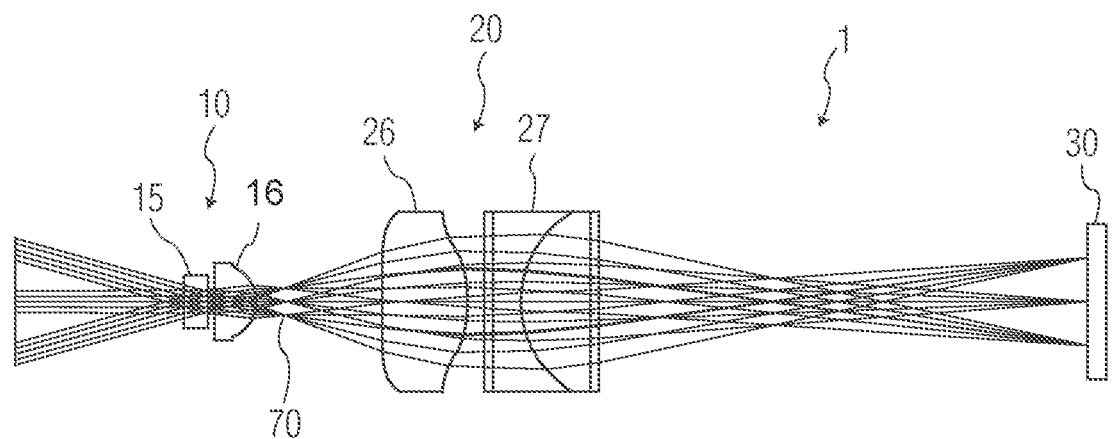
FIGS. 3a and 3b show an optical biopsy device according to another embodiment of the invention.
Figure 3B:
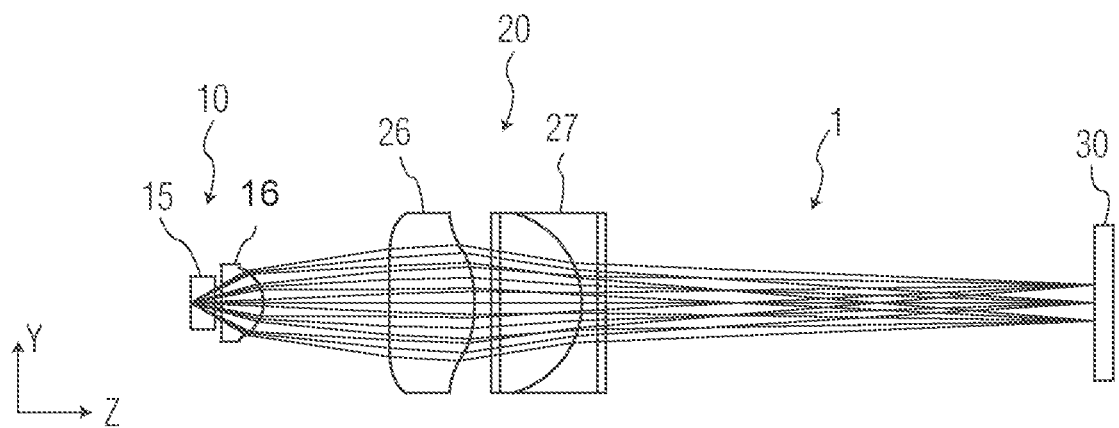

The optical biopsy device 1 as shown in FIGS. 3a and 3b includes the first lens group 10 and the second lens group 20. The first lens group consists of the protective glass plate 15 and the lens 16, whereas the second lens group 20 includes a first lens 26 and a switchable second lens 27. The switchable second lens 27 is a fluid focus lens.

Figure 4A:
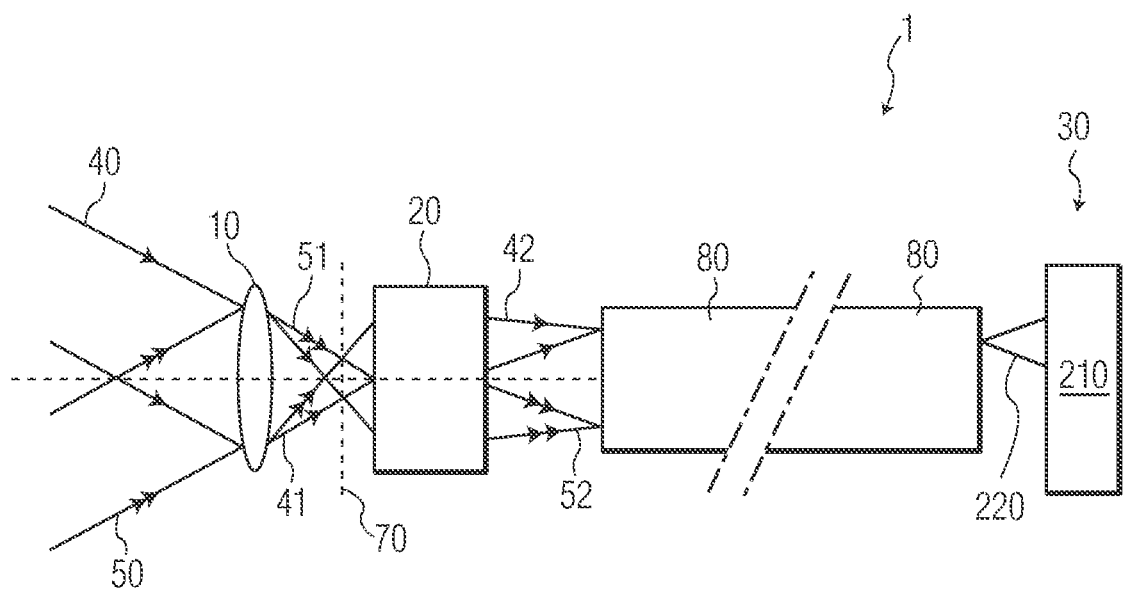
FIGS. 4a and 4b show an optical biopsy device according to an embodiment of the invention, where an image sensor is replaced by a fiber bundle.
Figure 4B:
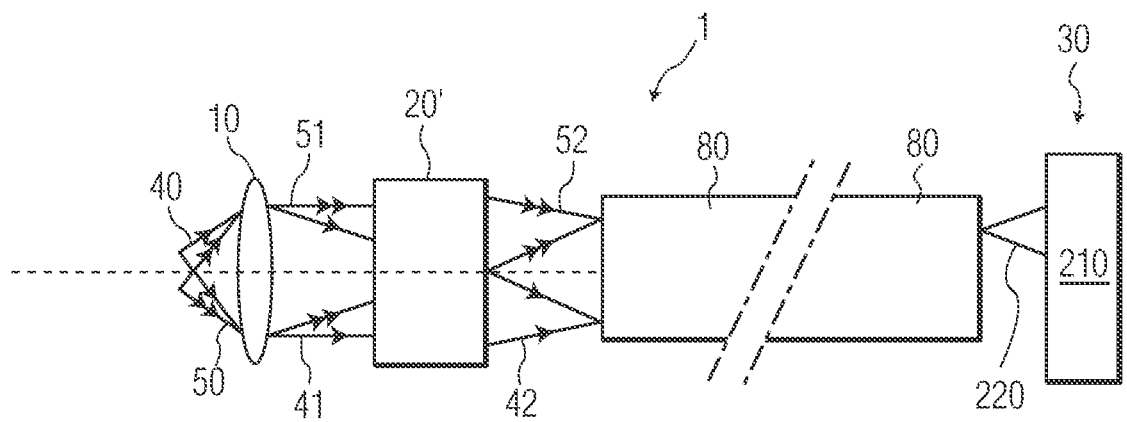

FIGS. 4a and 4b show an optical biopsy device 1 including a first lens group 10 and a second lens group 20. The image sensor 30 is replaced by a fiber bundle 80. In FIG. 4a, the first lens group 10 transforms a beam 40, 50 emerging from a distant target (not shown) into a beam 41, 51 and forms an intermediate image at plane 70 in between the first lens group 10 and the second lens group 20. The beam from the intermediate image 70 is further transformed into a beam 42, 52 and forms an image onto one end of the fiber bundle 80. The image is relayed to the other end of the fiber bundle 80 and is probed by the beam 220 from a console 210 of the image sensor 30. In FIG. 4b, the beam 40, 50 emerging from the close proximity target is transformed into a beam 41, 51 which is transformed by the second lens group 20' into a beam 42, 52 and forms an image onto one end of the fiber bundle 80. The image is relayed to the other end of the fiber bundle 80 and is probed by the beam 220 from a console 210 of the image sensor 30.

Figure 5:
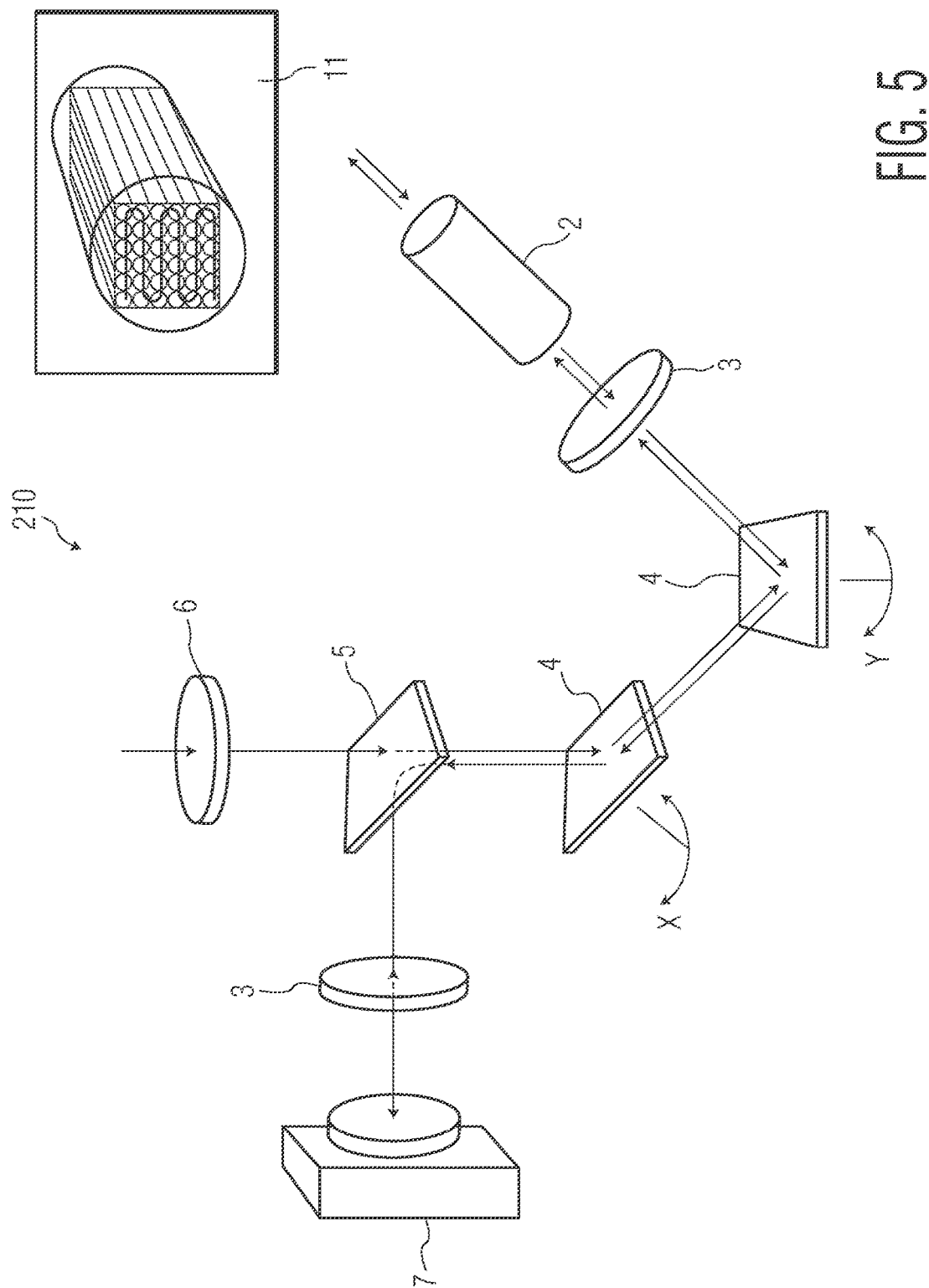
FIG. 5 shows a schematic view of a confocal scanning mechanism.

FIG. 5 shows a confocal scanning system as described in J. Vasc. Res. 2004; 41:400-411 by E. Laemmel et al., which is an example of a console system 210 of FIG. 4 therein. The insert 11 shows an extended view of the image bundle 2. 2 is an image bundle. 3 is a lens. 4 are tilting mirrors. 5 is a dichroic filter. 6 is a laser source. 7 is a photo detector. Details of the system are described in the above reference and are included by reference.

Figure 6A:
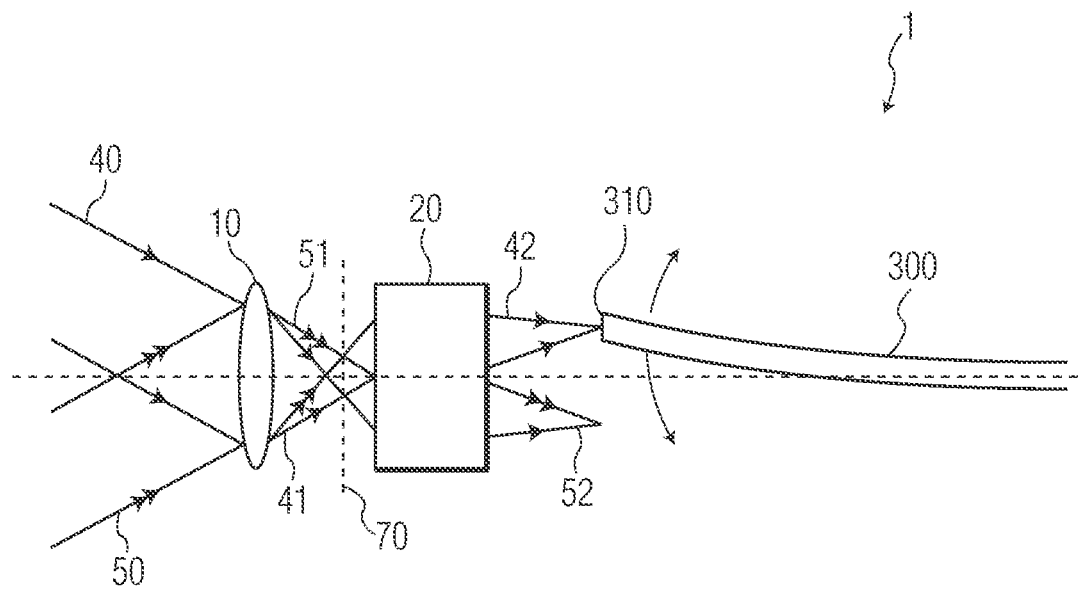
FIGS. 6a and 6b show an optical biopsy device where an image sensor is replaced by a scanning fiber.
Figure 6B:
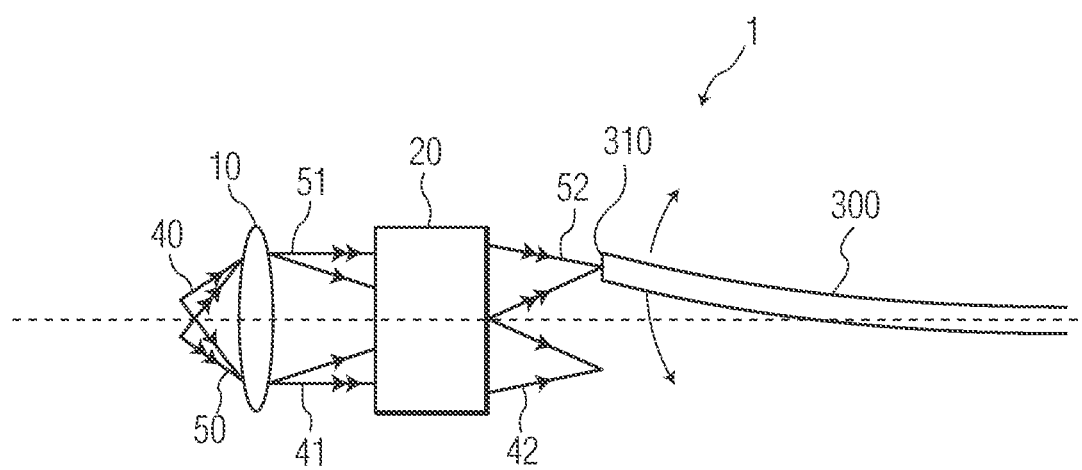

FIGS. 6a and 6b show an optical biopsy device 1 including a first lens group 10 and a second lens group 20. In this case, the image sensor is replaced by a scanning fiber 300 that reads out the images. This fiber 300 is connected to a console (not shown). In FIG. 6a, the first lens group 10 transforms a beam 40, 50 emerging from a distant target (not shown) into a beam 41, 51 and forms an intermediate image 70 before the second lens group 20. The beam from the intermediate image 70 is further transformed by the second lens group 20 into a beam 42, 52 and forms an image that is scanned by scanning the fiber end 310. The image formed can be read out and transferred to the console. In FIG. 6b, the beam 40, 50 emerging from the target is transformed into a beam 41, 51 and a beam 42, 52, and forms an image onto one end of the fiber bundle 80. The image is scanned by scanning the fiber end 310. The image formed can be read out and transferred to the console.

At the first magnification, the first lens group 10 with the optical axis 60, images the target from far away, first onto an intermediate image 70. This intermediate image is then imaged by the second lens group 20 containing a switchable optical element, in the first switching state, onto the image sensor 30. At this magnification, the first lens group 10 acts as a camera and images large tissue areas (macroscopic view). At the second magnification, the first lens group 10 images the target from close proximity, forming no intermediate image between the first lens group 10 and the second lens group 20 containing a switchable optical element. The switchable optical element at the second magnification images the beam onto the image sensor 30. The image sensor 30 can be a spectral detector. The switchable optical system 20 can be a mechanical actuation-based optical system or can be an electro-wetting principle-based optical system.

As shown in FIGS. 2a and 2b, a switchable lens system based on an electro-wetting principle consists of a cavity enclosed by the two lenses 21 and 22. The cavity 23 between the two lenses 21 and 22 is occupied by a conducting liquid and a non-conducting liquid. Both liquids do not mix. Switching between the two liquids is achieved by making use of the electro-wetting effect as described in EP-A1-1543370. Filling the cavity 23 with two different fluids gives rise to two different focal lengths of the second lens group 20. In the case of macroscopic viewing, the first lens group 10 images the target from far away, and the intermediate image 70 produced is imaged by the second lens group 20 onto the image sensor 30. The second lens group 20 acts as a relay lens. In this case, the cavity 23 of the switchable lens system 20 is filled with salted water (conducting liquid). For the microscopic view, the first lens group 10 is in close proximity of the target, and no intermediate image is formed, and the second lens group 20 is used to image the target in focus on the image sensor 30. In this way, two functionalities can be combined in one optical biopsy device. In this design, the microscope function has a magnification of 12.8. The macroscopic view has a field of view of 30 degrees and a magnification of 0.033. The change in magnification between the macroscopic and the microscopic view is thus a factor of 389.

The general formula describing a "sag" or z-coordinate of a surface as a function of the radial coordinate r is given by $$z(r) = \frac{r^2}{R(1 + \sqrt{1 - r^2/R^2})} + A_2 r^2 + A_4 r^4 + A_6 r^6 + A_8 r^8 + A_{10} r^{10} + A_{12} r^{12} + A_{14} r^{14} + A_{16} r^{16} \quad (1)$$

where R denotes the radius of each lens surface, r denotes the distance from the optical axis 60 and z the position of the sag of the surface in the z-direction along the optical axis 60. The coefficients $A_2$ to $A_{16}$ are the aspherical coefficients of the surface. If the lens surfaces are numbered from left to right in FIGS. 2a and 2b starting with the object plane as surface no. 0, the image plane at the image sensor will be surface no. 10. The stop of the lens system, determining the numerical aperture of the lens system, is positioned at the lens surface of lens 16 facing the lens group 2 (surface no. 5). Table 1 and Table 2 show the numerical values of the parameters for the lens surfaces in macroscopic and microscopic viewing.

For the macroscopic viewing, the stop diameter is 0.35 mm and the magnification is 0.0329. For the microscopic viewing, the stop diameter is 0.8 mm and the magnification is −12.838. All examples are designs at a wavelength of 650 nm.

The focal length $F_1$ of the first lens group is 0.545 mm and the distance $D_{12}$ between the first lens group and the second lens group is 2 mm. The lens system complies with $F_1 < D_{12}$. Furthermore, the focal length $F_2$ of the second group is 2.01 mm in the macroscopic view and $F_2$ is 3.07 mm in the microscopic view. Hence $|F_2/F_1|$ is greater than 1 in both views.

In Tables 1 to 4, "No" denotes the surface number, "R" the radius of the lens surface [mm], "d" denotes the lens thickness or the lens interval [mm], "n" denotes the refractive index of the lens. The coefficients $A_2$ to $A_{16}$ denote the aspherical coefficients: $A_2$ in [mm$^{-1}$], $A_4$ in [mm$^{-3}$], $A_6$ in [mm$^{-5}$], $A_8$ in [mm$^{-7}$], $A_{10}$ in [mm$^{-9}$], $A_{12}$ in [mm$^{-11}$], $A_{14}$ in [mm$^{-13}$], $A_{16}$ in [mm$^{-15}$]. In the last column, denoted as "remark", the object, the stop and the image surface are indicated.

TABLE 1

| No | R | D | n | A2 | A4 | A6 | A8 |
|---|---|---|---|---|---|---|---|
| 0 |  | 50.0 |  | 0 | 0 | 0 | 0 |
| 1 | Infinity | 0.1 | 1.5864 | 0 | 0 | 0 | 0 |
| 2 | Infinity | 0.308 | 1.4893 | 0 | 0 | 0 | 0 |
| 3 | −0.505 | 0.05 |  | 0 | 2.2781106 | 395.78477 | −22863.226 |
| 4 | Infinity | 0.5 | 1.4893 | 0 | 0 | 0 | 0 |
| 5 | Infinity | 2.0 |  | −1.4126962 | 3.4642668 | −199.81128 | 4177.5756 |
| 6 | −1.839 | 1.0 | 1.6000 | 0 | 0 | 0 | 0 |
| 7 | Infinity | 0.3 | 1.3313 | −0.59217799 | −0.22344204 | −0.046872184 | 0.31412181 |
| 8 | Infinity | 1 | 1.6000 | 0.68799559 | −0.14118644 | 0.48306084 | −0.35036155 |
| 9 | Infinity | 8 |  | 0 | −0.013601463 | 0.19970431 | −0.081464652 |
| 10 | Infinity |  |  | 0 | 0 | 0 | 0 |

| No | A10 | A12 | A14 | A16 | Remark |
|---|---|---|---|---|---|
| 0 | 0 | 0 | 0 | 0 | Object |
| 1 | 0 | 0 | 0 | 0 |  |
| 2 | 0 | 0 | 0 | 0 |  |
| 3 | 878251.69 | −18220793.0 | 1.95633 10$^8$ | −8.60217 10$^8$ |  |
| 4 | 0 | 0 | 0 | 0 |  |
| 5 | −49341.888 | 323794.08 | −1110030.3 | 1534803.9 | Stop |
| 6 | 0 | 0 | 0 | 0 |  |
| 7 | −0.5939669 | 0 | 0 | 0 |  |
| 8 | 0.14318611 | 0 | 0 | 0 |  |
| 9 | 0 | 0 | 0 | 0 |  |
| 10 | 0 | 0 | 0 | 0 | Image |

TABLE 2

| No | R | d | N | A2 | A4 | A6 | A8 |
|---|---|---|---|---|---|---|---|
| 0 |  | 0.075 |  | 0 | 0 | 0 | 0 |
| 1 | Infinity | 0.1 | 1.5864 | 0 | 0 | 0 | 0 |
| 2 | Infinity | 0.308 | 1.4893 | 0 | 0 | 0 | 0 |
| 3 | −0.505 | 0.05 |  | 0 | 2.2781106 | 395.78477 | −22863.226 |
| 4 | Infinity | 0.5 | 1.4893 | 0 | 0 | 0 | 0 |
| 5 | Infinity | 2.0 |  | −1.4126962 | 3.4642668 | −199.81128 | 4177.5756 |
| 6 | −1.839 | 1.0 | 1.6000 | 0 | 0 | 0 | 0 |

TABLE 2-continued

| | | | | | | | | |
|---|---|---|---|---|---|---|---|---|
| 7 | Infinity | 0.3 | 1.6000 | −0.59217799 | −0.22344204 | −0.046872184 | 0.31412181 |
| 8 | Infinity | 1 | 1.6000 | 0.68799559 | −0.14118644 | 0.48306084 | −0.35036155 |
| 9 | Infinity | 8 | | 0 | −0.013601463 | 0.19970431 | −0.081464652 |
| 10 | Infinity | | | 0 | 0 | 0 | 0 |

| No | A10 | A12 | A14 | A16 | Remark |
|---|---|---|---|---|---|
| 0 | 0 | 0 | 0 | 0 | Object |
| 1 | 0 | 0 | 0 | 0 | |
| 2 | 0 | 0 | 0 | 0 | |
| 3 | 878251.69 | −18220793.0 | 1.95633 $10^8$ | −8.60217 $10^8$ | |
| 4 | 0 | 0 | 0 | 0 | |
| 5 | −49341.888 | 323794.08 | −1110030.3 | 1534803.9 | Stop |
| 6 | 0 | 0 | 0 | 0 | |
| 7 | −0.5939669 | 0 | 0 | 0 | |
| 8 | 0.14318611 | 0 | 0 | 0 | |
| 9 | 0 | 0 | 0 | 0 | |
| 10 | 0 | 0 | 0 | 0 | Image |

Switching between the macroscopic and the microscopic viewing is possible by using the second lens group 20 as shown in FIGS. 3a and 3b. The first lens 26 of the second lens group 20 is a fixed lens, while the second lens 27 is a fluid focus lens as described in U.S. Pat. No. 7,126,903 B2. The fluid focus lens 27 consists of water and oil. In the case of the macroscopic viewing, the first lens group 10 is distant from the target and an intermediate image 70 is formed in between the first lens group 10 and the second lens group 20, which intermediate image 70 is further imaged by the second lens group 20 onto the image sensor 30. The second lens group 20, with the lens 27 in the first switching state, acts as a relay lens. For the microscopic viewing, with the fluid focus lens 27 in the second switching state, the first lens group 10 is in close proximity of the target and no intermediate image is formed in between the first lens group and the second lens group. In this way two functionalities can be combined in one optical biopsy device. In this design the microscope function has an absolute value of the magnification of 9.4. The macroscopic view has a field of view of 30 degrees, with the absolute value of the magnification equal to 0.036. The change in magnification between the macroscopic and the microscopic view is thus a factor of 262.

Table 3 and Table 4 show the numerical values of the parameters for this design in macroscopic and microscopic viewing, respectively. For macroscopic viewing, the stop diameter is 0.26 mm. For microscopic viewing, the stop diameter is 0.8 mm. All examples are designs at a wavelength of 650 nm.

The focal length $F_1$ of the first lens group is 0.545 mm and the distance $D_{12}$ between the first lens group and the second lens group is 1.5 mm. Furthermore, the focal length $F_2$ of the second lens group is 1.54 mm in the macroscopic view and is 3.27 mm in the microscopic view. Hence $|F_2/F_1|$ is always greater than 1.

TABLE 3

| No | R | d | n | A2 | A4 | A6 | A8 |
|---|---|---|---|---|---|---|---|
| 0 | | 52.0 | | 0 | 0 | 0 | 0 |
| 1 | Infinity | 0.308 | 1.4893 | 0 | 0 | 0 | 0 |
| 2 | −0.505 | 0.05 | | 0 | 2.2781062 | 395.78578 | −22863.304 |
| 3 | Infinity | 0.5 | 1.4893 | 0 | 0 | 0 | 0 |
| 4 | Infinity | 1.5 | | −1.4126962 | 3.4642668 | −199.81128 | 4177.5756 |
| 5 | −16.123 | 1.0 | 1.5803 | 0 | 0.10876535 | −0.066019473 | 0.19278492 |
| 6 | −1.203 | 0.2 | | 0 | 0.083373851 | 0.037893098 | 0.11166808 |
| 7 | Infinity | 0.1 | 1.5145 | 0 | 0 | 0 | 0 |
| 8 | Infinity | 0.167 | 1.3313 | 0 | 0 | 0 | 0 |
| 9 | −1.0 | 0.816 | 1.6000 | 0 | 0 | 0 | 0 |
| 10 | Infinity | 0.1 | 1.5145 | 0 | 0 | 0 | 0 |
| 11 | Infinity | 5.8 | | 0 | 0 | 0 | 0 |
| 12 | Infinity | | | 0 | 0 | 0 | 0 |

| No | A10 | A12 | A14 | A16 | Remark |
|---|---|---|---|---|---|
| 0 | 0 | 0 | 0 | 0 | Object |
| 1 | 0 | 0 | 0 | 0 | |
| 2 | 878255.44 | −18220886 | 1.95633 $10^8$ | −8.60223 $10^8$ | |
| 3 | 0 | 0 | 0 | 0 | Stop |
| 4 | −49341.888 | 323794.08 | −1110030.3 | 1534803.9 | |
| 5 | 0 | 0 | 0 | 0 | |
| 6 | 0 | 0 | 0 | 0 | |
| 7 | 0 | 0 | 0 | 0 | |
| 8 | 0 | 0 | 0 | 0 | |
| 9 | 0 | 0 | 0 | 0 | |
| 10 | 0 | 0 | 0 | 0 | |
| 11 | 0 | 0 | 0 | 0 | |
| 12 | 0 | 0 | 0 | 0 | Image |

TABLE 4

| No | R | d | n | A2 | A4 | A6 | A8 |
|---|---|---|---|---|---|---|---|
| 0 | | 0.0 | | 0 | 0 | 0 | 0 |
| 1 | Infinity | 0.308 | 1.4893 | 0 | 0 | 0 | 0 |
| 2 | −0.505 | 0.05 | | 0 | 2.2781062 | 395.78578 | −22863.304 |
| 3 | Infinity | 0.5 | 1.4893 | 0 | 0 | 0 | 0 |
| 4 | Infinity | 1.5 | | −1.4126962 | 3.4642668 | −199.81128 | 4177.5756 |
| 5 | −16.123 | 1.0 | 1.5803 | 0 | 0.10876535 | −0.066019473 | 0.19278492 |
| 6 | −1.203 | 0.2 | | 0 | 0.083373851 | 0.037893098 | 0.11166808 |
| 7 | Infinity | 0.1 | 1.5145 | 0 | 0 | 0 | 0 |
| 8 | Infinity | 0.983 | 1.3313 | 0 | 0 | 0 | 0 |
| 9 | −1.0 | 0.167 | 1.6000 | 0 | 0 | 0 | 0 |
| 10 | Infinity | 0.1 | 1.5145 | 0 | 0 | 0 | 0 |
| 11 | Infinity | 5.8 | | 0 | 0 | 0 | 0 |
| 12 | Infinity | | | 0 | 0 | 0 | 0 |

| No | A10 | A12 | A14 | A16 | Remark |
|---|---|---|---|---|---|
| 0 | 0 | 0 | 0 | 0 | Object |
| 1 | 0 | 0 | 0 | 0 | |
| 2 | 878255.44 | −18220886 | $1.95633 \cdot 10^8$ | $-8.60223 \cdot 10^8$ | |
| 3 | 0 | 0 | 0 | 0 | Stop |
| 4 | −49341.888 | 323794.08 | −1110030.3 | 1534803.9 | |
| 5 | 0 | 0 | 0 | 0 | |
| 6 | 0 | 0 | 0 | 0 | |
| 7 | 0 | 0 | 0 | 0 | |
| 8 | 0 | 0 | 0 | 0 | |
| 9 | 0 | 0 | 0 | 0 | |
| 10 | 0 | 0 | 0 | 0 | |
| 11 | 0 | 0 | 0 | 0 | |
| 12 | 0 | 0 | 0 | 0 | Image |

In all the above mentioned embodiments, the image is formed on the image sensor 30. To make the design of the optical device simpler, relaying the image using a fiber bundle technique as described for instance in J. Vasc. Res. 2004; 41:400-411 by E. Laemmel et al. is preferably employed. Instead of being imaged onto an image sensor 30, the image is now imaged on one end of a fiber bundle 80 as shown in FIGS. 4a and 4b. This fiber bundle 80 consists of many tiny fibers. The image is then relayed by this fiber bundle to the other end of the fiber bundle 80. The other end of the fiber can now be probed by the beam 220 of the console 210. An example of such a console 210 is, for instance, a confocal scanning system as shown in FIG. 5 and as described in J. Vasc. Res. 2004; 41:400-411 by E. Laemmel et al. This reference shows an example of the scanning system 210 and 220 of FIGS. 4a and 4b to read out the relayed image by means of the fiber bundle 80.

In a further embodiment, as shown in FIGS. 6a and 6b, a single scanning fiber 300 is used for relaying the image formed. This fiber 300 is connected to a console (not shown). By scanning the fiber end 310, the image formed by the optical probe can be read out and transferred to the console as described in US-A1-20050052753.

It is to be understood that although preferred embodiments, specific constructions and configurations, as well as materials, have been discussed herein for devices according to the present invention, various changes or modifications in form and detail may be made without departing from the scope and spirit of this invention. In particular the switchable lens may be of any type, such as a displaceable lens being moved by a mechanical motor or a switchable lens based on liquid crystal principles.

The invention claimed is:

1. A lens system comprising:
a first lens group and a second lens group having a first switching state and a second switching state, said lens system being configured to form an image of a target at a first magnification and at a second magnification, the lens system comprising a common optical axis in both the first and the second magnifications, wherein, in the first switching state of the second lens group, the lens system is arranged such that the first lens group is distant from the target, and the lens system is configured to form an intermediate image between the first lens group and the second lens group at the first magnification, and wherein, in the second switching state of the second lens group, the lens system is arranged such that the first lens group is in close proximity of the target, and the lens system is configured not to form the intermediate image between the first lens group and the second lens group at the second magnification.

2. The lens system of claim 1, wherein in the first magnification, the first lens group and the second lens group are configured to form a macroscopic view of the target, and in the second magnification, the first lens group and the second lens group are configured to form a microscopic view of the target.

3. The lens system of claim 2, wherein an absolute value of the first magnification is at least 100 times smaller than the absolute value of the second magnification.

4. The lens system of claim 1, wherein the first lens group has a fixed focal length F1 and the second lens group has a switchable focal length F2, and the first lens group and the second lens group are separated by a fixed distance of D12, and wherein the fixed focal length F1 of the first lens group is smaller than the distance D12.

5. The lens system of claim 4, wherein the focal length F1 of the first lens group and the switchable focal length F2 of the second lens group comply with $|F2/F1|>1$ when the second lens group is in both the first switching state and the second switching state.

6. An optical biopsy device comprising:
an inserting tube to be inserted into a body; and
a lens system secured in a tip end of the inserting tube, said lens system having a first lens group and a second lens group having a first switching state and a second switching state, said lens system being configured to form an image of a target at a first magnification and at a second magnification, the lens system having a common optical axis in both magnifications, wherein, in the first switching state of the second lens group, the lens system is arranged such that the first lens group is distant from the target, and the lens system is configured to form an intermediate image between the first lens group and the second lens group only at the first magnification, and wherein in the second switching state of the second lens group, the lens system is arranged such that the first lens group is in close proximity of the target, and the lens system is configured not to form the intermediate image between the first lens group and the second lens group at the second magnification.

7. The optical biopsy device of claim 6, wherein the second lens group comprises one or more switchable lenses configured to switch between the first switching state in the first magnification and the second switching state in the second magnification.

8. The optical biopsy device of claim 7, wherein at least one of the one or more switchable lenses arrangement is configured to function according to an electro-wetting principle.

9. The optical biopsy device of claim 6, wherein the second lens group consists of at least one fixed lens and one switchable lens.

10. The optical biopsy device of claim 6, further comprising an image sensor, wherein the image formed by the lens system is imaged onto the image sensor.

11. The optical biopsy device of claim 6, further comprising:
a fiber bundle configured to relay the image formed by the lens system; and
an optical scanning console optically coupled to the fiber bundle and configured to read out the image formed.

12. The optical biopsy device of claim 6, further comprising:
a single scanning fiber configured to read out the image formed by the lens system; and
an optical scanning console optically coupled to the single scanning fiber and configured to reconstruct the image formed.

13. A lens system adapted to be used for an optical biopsy device comprising:
a first lens group and a switchable second lens group having a first switching state and a second switching state, said lens system being configured to form an image of a target at a first magnification and at a second magnification, wherein the lens system has a common optical axis in both magnifications, and wherein: in the first switching state of the second lens group, the lens system is arranged such that the first lens group is distant from the target, and the lens system is configured to form an intermediate image between the first lens group and the second lens group only at the first magnification, and in the second switching state of the second lens group, the lens system is arranged such that the first lens group is in close proximity to the target, and the lens system is configured not to form the intermediate image between the first lens group and the second lens group at the second magnification, and at the first magnification in the first switching state, the second lens group is adapted to image the intermediate image onto an optical detector.

14. The lens system of claim 13, wherein the first magnification is corresponds to a macroscopic view of the target and the second magnification corresponds to a microscopic view of the target.

15. The lens system of claim 14, wherein an absolute value of the first magnification is at least 100 times smaller than an absolute value of the second magnification.

16. The lens system of claim 14, wherein a focal length F1 of the first lens group and a switchable focal length F2 of the second lens group comply with |F2/F1|>1 when the second lens group is in both the first switching state and the second switching state.

17. The lens system of claim 14, wherein the second lens group comprises one or more switchable lenses configured to switch between the first switching state in the first magnification and the second switching state in the second magnification.

* * * * *